(12) United States Patent
Wilmarth

(10) Patent No.: US 8,387,057 B2
(45) Date of Patent: Feb. 26, 2013

(54) FAST AND LINEARIZABLE CONCURRENT PRIORITY QUEUE VIA DYNAMIC AGGREGATION OF OPERATIONS

(75) Inventor: Terry Wilmarth, Urbana, IL (US)

(73) Assignee: Intel Corporation, Santa Clara, CA (US)

( * ) Notice: Subject to any disclaimer, the term of this patent is extended or adjusted under 35 U.S.C. 154(b) by 249 days.

(21) Appl. No.: 12/970,691

(22) Filed: Dec. 16, 2010

(65) Prior Publication Data

US 2012/0159498 A1 Jun. 21, 2012

(51) Int. Cl.
*G06F 9/46* (2006.01)
*G06F 17/30* (2006.01)
(52) U.S. Cl. ......... 718/102; 707/799; 707/800; 707/801
(58) Field of Classification Search .................. None
See application file for complete search history.

(56) References Cited

U.S. PATENT DOCUMENTS

| | | | | |
|---|---|---|---|---|
| 6,954,933 | B2* | 10/2005 | Stall | 719/314 |
| 6,988,180 | B2* | 1/2006 | Kadatch | 711/216 |
| 7,117,502 | B1* | 10/2006 | Harris | 719/315 |
| 7,424,477 | B1* | 9/2008 | Martin et al. | 1/1 |
| 7,802,032 | B2* | 9/2010 | Christenson | 710/52 |
| 7,836,228 | B1* | 11/2010 | Moir et al. | 710/52 |
| 7,844,973 | B1* | 11/2010 | Dice | 718/108 |
| 7,937,378 | B2* | 5/2011 | Shavit et al. | 707/704 |
| 8,095,491 | B1* | 1/2012 | Dillon | 706/46 |
| 8,141,086 | B2* | 3/2012 | Cocks et al. | 718/102 |
| 2006/0005191 | A1* | 1/2006 | Boehm | 718/100 |
| 2010/0205484 | A1* | 8/2010 | Dragicevic et al. | 714/37 |

OTHER PUBLICATIONS

Sundell et al, "Fast and Lock-Free Concurrent Priority Queues for Multi-Thread System", Science Direct, 2005, p. 609-627.*
Moir et al, "Concurrent Data Structures", CRC Press, 2001, p. 1-32.*
Michael et al, "Simple, Fast, and Practical Non-Blocking and Blocking Concurrent Queue Algorithms", ACM, 1996, p. 267-275.*
Dragicevic et al, "Optimization Techniques for Concurrent STM-Based Implementations: A Concurrent Binary Heap as a Case Study", IEEE, 2009, p. 1-8.*
Hunt et al, "An Efficient Algorithm for Concurrent Priority Queue Heaps", Elsevier, 1996, p. 151-157.*
International Search Report and Written Opinion received in PCT Application Serial No. PCT/US2011/061373, mailed Jun. 29, 2012, 7 pages.
Kazi I.H. "JavaSpMT: A Speculative thread pipelining parallelization model for Java programs", In: 14th International Parallel and Distributed Processing Symposium, IEEE, 2000, 6 pages.
Huang Q. "An evaluation of concurrent priority queue algorithms", In: The Third IEE Symosium on Parallel Distributed Processing, Dec. 2-5, 1991, 8 pages.

* cited by examiner

*Primary Examiner* — Jennifer To
(74) *Attorney, Agent, or Firm* — Joni D. Stutman

(57) ABSTRACT

Embodiments of the invention improve parallel performance in multi-threaded applications by serializing concurrent priority queue operations to improve throughput. An embodiment uses a synchronization protocol and aggregation technique that enables a single thread to handle multiple operations in a cache-friendly fashion while threads awaiting the completion of those operations spin-wait on a local stack variable, i.e., the thread continues to poll the stack variable until it has been set or cleared appropriately, rather than rely on an interrupt notification. A technique for an enqueue/dequeue (push/pop) optimization uses re-ordering of aggregated operations to enable the execution of two operations for the price of one in some cases. Other embodiments are described and claimed.

28 Claims, 8 Drawing Sheets

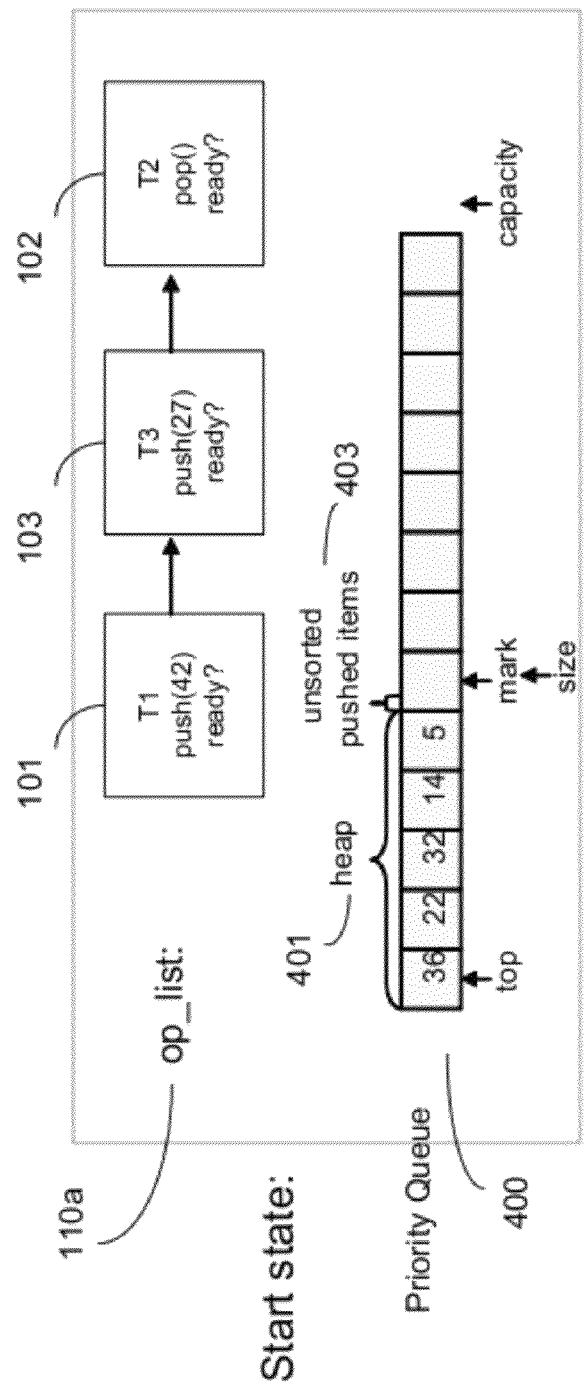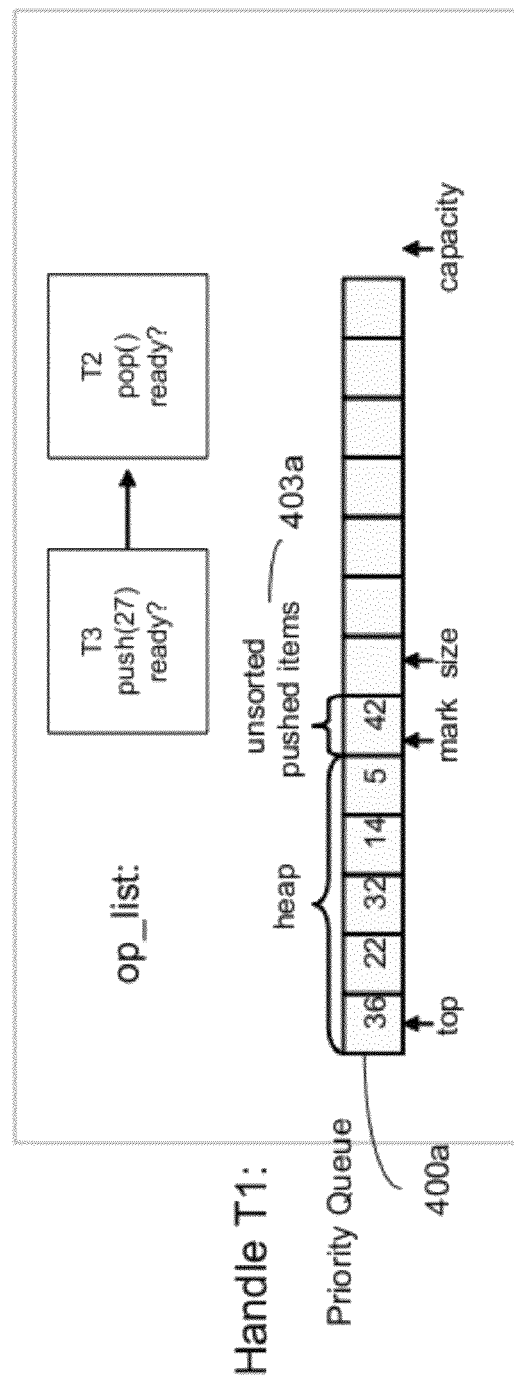

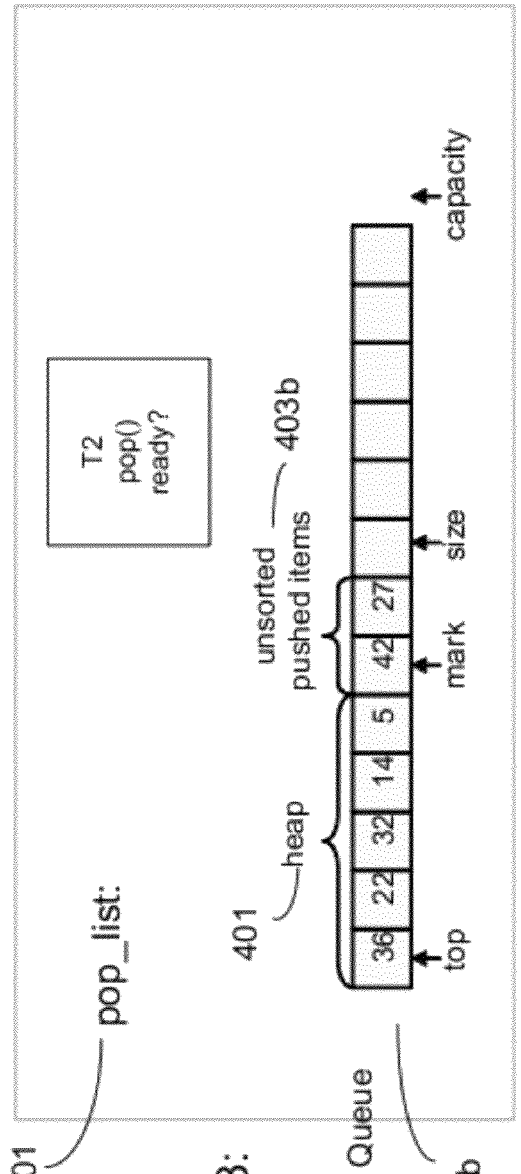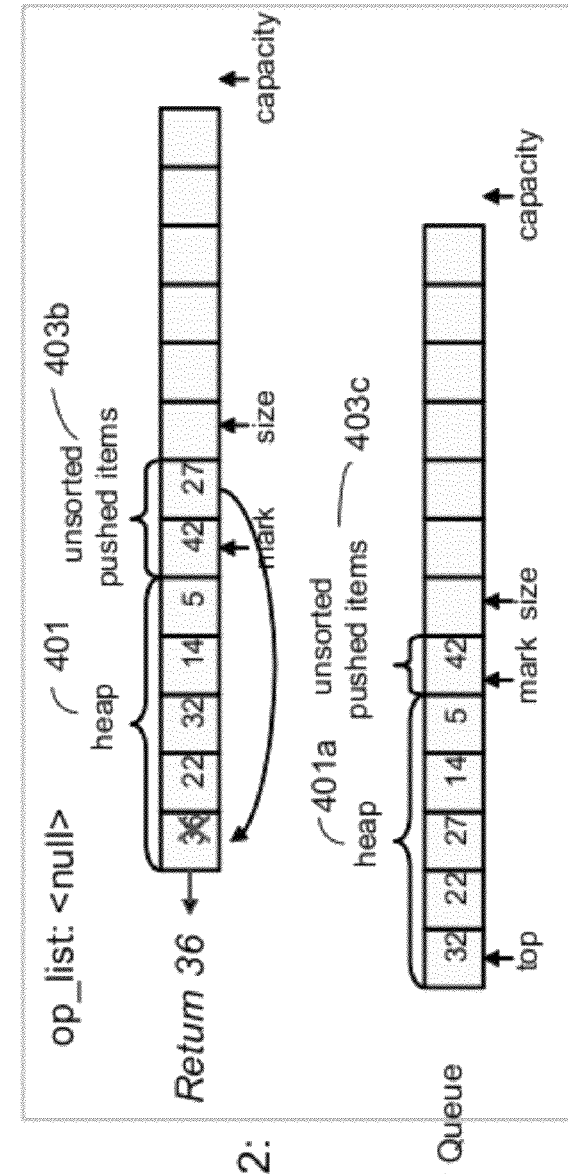

FAST AND LINEARIZABLE CONCURRENT PRIORITY QUEUE VIA DYNAMIC AGGREGATION OF OPERATIONS

FIELD OF THE INVENTION

An embodiment of the present invention relates generally to dynamic aggregation and optimization of concurrent entities in a computing system and, more specifically, to dynamic aggregation of operations to accelerate accessing and modifying a list, priority queue, or other concurrent entity, concurrently in a scalable and linearizable fashion, and the use of the list to optimize operations on a concurrent entity such as a priority queue.

BACKGROUND INFORMATION

Various mechanisms exist for accessing and modifying priority queues. Priority queues are a modified queue construct. In a first-in-first-out queue (FIFO), for instance, the first element to be placed on the queue (enqueued or pushed) is the first to be removed (dequeued or popped). In a priority queue, the first element to be removed (popped) is the element in the queue with the highest priority at the time. Thus, the priority queue may have an underlying representation that favors the ordered dequeuing of elements based on a user-defined priority on those elements.

Priority queues are often used for storage of information or tasks in multi-threaded computing systems. However, in a multi-threaded system, more than one thread may try to access the queue at the same time. Thus, existing systems may implement a series of locking algorithms to ensure that there is no contention for adding and removing items, and to maintain the underlying representation of the priority queue. The priority queue is often maintained with a heap data structure, for ease of locating the highest priority element and restructuring after additions to and removals from the heap.

Many algorithms for implementing concurrent priority queues are based on mutual exclusion (locking). However, mutual exclusion algorithms cause blocking, which may degrade overall performance of the system. Further, thread locking typically allows only one thread to operate at a time, which reduces this method to that of serial performance with the addition of locking overhead. In some cases, the overhead of this method may lead to worse than serial performance. Another type of solution is that some algorithms may attempt to perform concurrently within the queue itself. In this case, multiple threads are operating on the queue at the same time, so access to each element of the queue must protected. This may use an internal locking or other system to prevent races on specific queue elements. Such algorithms improve concurrency, but many such algorithms were too complex and suffered high overhead from the internal locking, and so did not perform well in practice.

BRIEF DESCRIPTION OF THE DRAWINGS

The features and advantages of the present invention will become apparent from the following detailed description of the present invention in which:

FIGS. 4-8 show an example of the enqueue and dequeue operations performed by the handler on a concurrent priority queue, according to an embodiment of the invention

DETAILED DESCRIPTION

Figure 1:
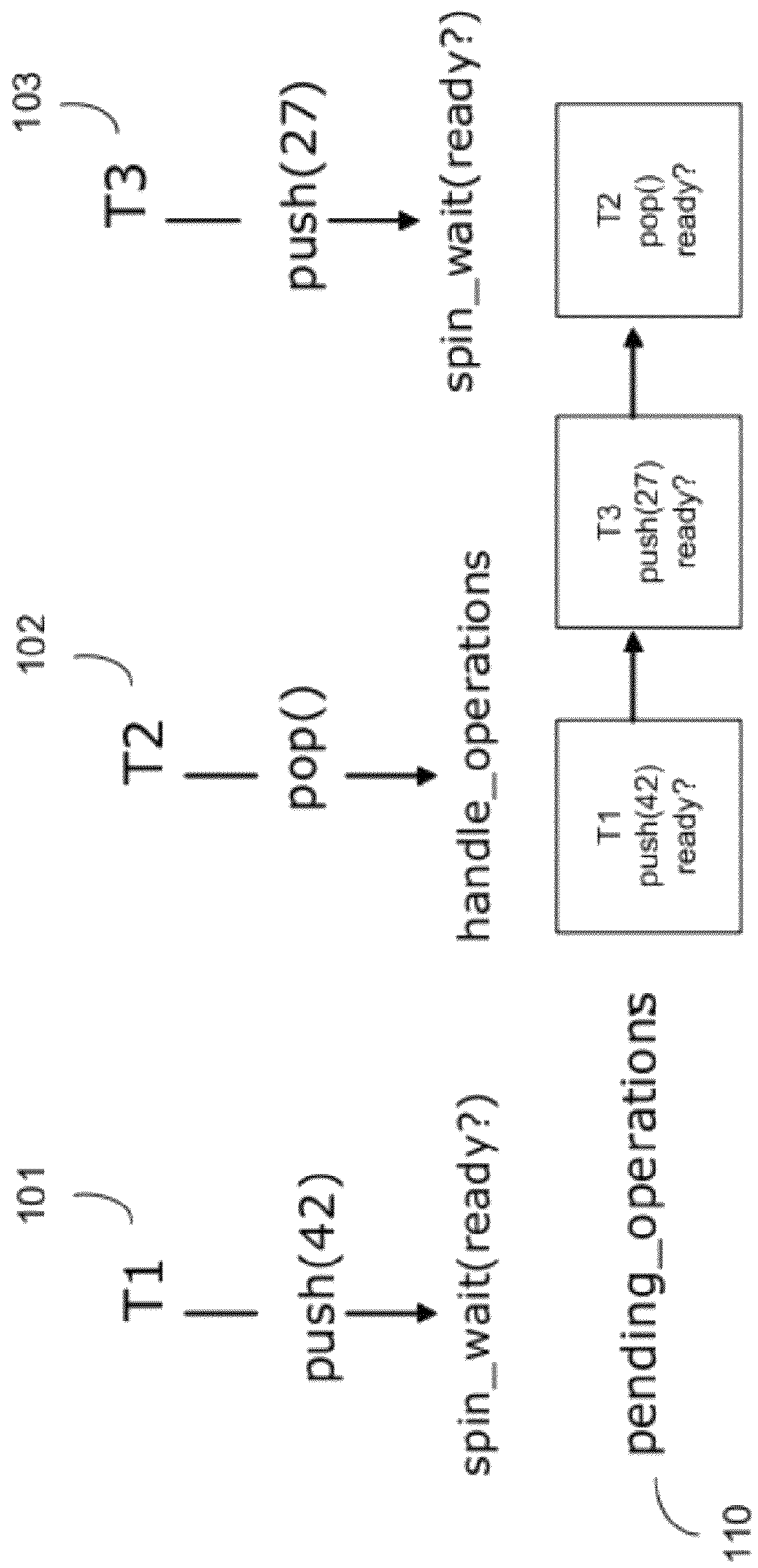
FIG. 1 illustrates a representation of an example pending_operations list having items to be put on the priority queue, and also shows the timelines of the three threads that are waiting on the operations in the pending_operations list, according to an embodiment of the invention.

Embodiments of the invention improve parallel performance by serializing concurrent priority queue operations in a way that improves throughput. It will be understood that while priority queues are used to illustrate an example embodiment of the invention, other embodiments may operate on other types of concurrent entities, or concurrent data structures. An embodiment has two components: (1) a synchronization protocol and aggregation technique that enables a single thread to handle multiple operations in a cache-friendly fashion while threads awaiting the completion of those operations spin-wait on a local stack variable, i.e., the thread continues to poll the stack variable until it has been set or cleared appropriately, rather than rely on an interrupt notification; and (2) an enqueue/dequeue (push/pop) optimization that uses re-ordering of aggregated operations to enable the execution of two operations for the price of one.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

In an example system, a priority queue may be used to schedule graphics operations for a graphical user interface (GUI). In a GUI system, there may be a large number of inputs arriving from various sources. Some inputs may be more important than others. The inputs, or desired operations, will be received and the process that is to perform the operations will place the items into the queue in priority order, and then process them by priority.

In another example system, priority queues may be used for parallel discrete event simulation. Modeling network traffic is an example of this type of simulation. In this type of application, the priority may be a timestamp for when an event must occur. It will be understood by those of skill in the art that priority queues may be implemented in a variety of applications, and that optimizing the queue operations may result in a significant enhanced performance of the system.

It will be understood embodiments of the invention may be used for a wide variety of applications. Priority queue inputs may be generated/received on various processes, which in turn will place the inputs in the queue. It will be understood that embodiments of the invention operate with multiple processes adding items to the one queue, concurrently. One or more other processes concurrently remove the items from the priority queue to process them. The queue itself, via defined push/enqueue and pop/dequeue operations, organizes the inputs into some internal data structure and answers requests for items by removing them in priority order.

An embodiment of the invention integrates the two components (synchronization and aggregation; and enqueue/dequeue optimization) to provide a system for maintaining a concurrent priority queue that minimizes cache misses and speeds up heap sorting of the priority queue. Each component utilizes specific data structures and techniques to aid in implementation. In an example embodiment, the following terms or structures may be used, as defined below, although it will be apparent to those of skill in the art that alternative data structures may be used while still enjoying advantages of embodiments of the invention.

pending_operations list: a pointer to a linked list of operations (e.g. push and pop in the case of a concurrent priority queue) to be performed by a thread op_list: a pointer to the original pending_operations list at the point when a handler thread takes control of the list to perform the pending operations on the priority queue priority queue: The actual internal data structure which stores the items that are pushed into the concurrent priority queue. The data structure may be an array, in heap representation, with the highest priority item being at the front of the array (i.e. the top of the heap).

active handler: The first thread to place an item on the pending_operations list becomes the active handler when that list is ready to be acted upon.

waiting handler: When a thread is the first to place an item on the pending_operations list, it becomes the waiting handler, awaiting a flag (handler_busy flag) to be reset to FALSE.

cpq_operation: The thread operation, or operation node, that is to be put on the pending_operations list, representing an operation (e.g. push or pop) that is to be applied to the priority queue.

handler_busy flag: When a waiting handler becomes an active handler, it sets this flag to TRUE to prevent another thread from trying to become handler. When the active handler is finished with the appointed tasks, it resets this flag to be false, and resumes normal operations.

pop_list: A list of cpq_operations representing dequeue operations only to be applied to the priority queue.

compare-and-swap (CAS): An atomic operation used in embodiments of the invention to put an item into a linked list where multiple threads may be trying to modify the list simultaneously. The atomic nature of this instruction obviates the need to lock the list from other threads.

fetch-and-store: An atomic operation used in embodiments of the invention to grab a list and replace it with a null list, usually implemented by changing pointers to the lists.

The synchronization and aggregation component of an embodiment utilizes the handler_busy flag, pending_operations list and op_list. Operations on the priority queue will be discussed in conjunction with the second component. It will be understood that each component, as discussed herein, may be implemented in a system without implementing the other component, e.g., the components may stand alone. Embodiments of the invention, however, may utilize both components in an integrated fashion.

Embodiments of the invention allow each thread to schedule its push and pop operations by using a list known herein as the pending_operations list. While the terms push and pop sometimes infer a stack data structure (LIFO), the terms are used herein to be synonymous with enqueue and dequeue, and used for simplicity. These operations stored in the pending_operations list, are later performed by a handler thread on the internal data structure that represents the priority queue, and the thread requesting the queue operation waits until it receives notification that its operation has been completed. Thus, since only one thread handles the pending_operations to modify the internal priority queue, no locking mechanism is needed to prevent thread contention on the internal priority queue. As the handler performs operations and notifies a waiting thread that its operation has been completed, the thread may go on to request another operation on the concurrent priority queue. However, this new operation will be placed on the next pending_operations list, and not the one currently being operated upon (op_list) because once a handler takes control of the pending_operations list, it atomically fetches the list (fetch-and-store) into op_list, and stores a NULL pointer in pending_operations (to signify that the list is empty) for subsequent threads to add operations to. Each pending_operations list is handled in turn in this way, with each instance that is stored in op_list containing no more that P operations, where P is the number of threads running. Thus, no thread must wait for more than P operations before its operation is completed.

Because each thread waits until its operation is completed before being able to schedule another operation, there may be only a total of P operations outstanding at once, and only two lists are necessary: the active list (op_list) being operated on by the handler thread, and the waiting list (pending_operations) where threads continue to add items. For instance, the active list may have n items, where $0 \leq n \leq P$ and the waiting list may have m items where $0 \leq m \leq P-n$.

Referring now to FIG. 1, there is shown a representation of an example pending_operations list having items to be put on the priority queue. It will be understood that the terms push and pop may be used interchangeable with the terms enqueue and dequeue, respectively, with no loss of generality or specificity in the description herein. In an embodiment of the invention, a pending_operations list may be used. As threads attempt to enqueue items to and dequeue items from the priority queue, they instead add a record of the desired operation to the pending_operations list.

In this example, there are three threads T1 (101), T2 (102) and T3 (103). It will be understood that there may be 1 to P threads operating at the same time. Each thread is to add an operation on the pending_operations list 110, as necessary. However, a thread may only add one operation to the list, because the thread is then put into a spin-wait until that operation is actually performed on the priority queue. Threads may attempt to concurrently insert push and pop operations onto the pending_operations list 110. In an embodiment, operations on the list are concurrent priority queue operations, or a cpq_operation. To add an operation to the list, an atomic compare-and-swap (CAS) is used for entry to the list. The list is typically a linked list. The thread uses an atomic CAS operation to add a cpq_operation, or operation node, to the list 110, in order to ensure another thread has not modified the list pointers while it is preparing to add its operation to the list. The operation to be added to the list is then added to the front of the pending_operations list. If the CAS operation fails, it means another thread added an item to the list first, and now the next pointers are different. In this case, the thread will rebuild the pointers in its operation node and attempt the CAS again, until the operation has been successfully added to the list.

In an embodiment of the invention, the first thread to place a cpq_operation on the pending_operations list becomes the handler for that list. Other threads that have placed an operation node on the list will wait on a ready flag before being permitted to continue normal operations. In this example, T1 101 is to push item 42 onto the priority queue. T2 102 wants to pop an item from the priority queue, and T3 103 is to push item 27 to the priority queue. In the example of FIG. 1, thread T2 102 was the first to successfully add an operation to pending_operations 110 (its next pointer is NULL) and thus T2 will eventually become the handler for the pending_operations list.

According to embodiments of the invention, there is at most one active handler (processing op_list) and at most one waiting handler (waiting to process pending_operations) at a time. A waiting handler spin-waits on a global handler_busy flag. When the handler_busy flag becomes FALSE, the waiting handler sets the flag to TRUE and becomes the active handler. The active handler then uses the fetch_and_store to move pending_operations to op_list. When the active handler is finished handling operations on the op_list, to be discussed more fully below, it sets handler_busy to FALSE. When a handler becomes active, it atomically points op_list at the pending_operations list and points pending_operations to NULL so that the addition of subsequent operations form a new list. It will be understood that these grab and replace operations may be performed by changing the pointers which identify the various lists, and the elements of these lists need not be fully copied to a new list. The op_list represents an aggregation of concurrent operations to be performed on the priority queue that may be serially processed in an optimal fashion. The active handler will execute the operations in the op_list, as discussed for the enqueue/dequeue optimization component, below, and new operations to be handled by the waiting handler are put into the new pending_operations list.

Figure 2:
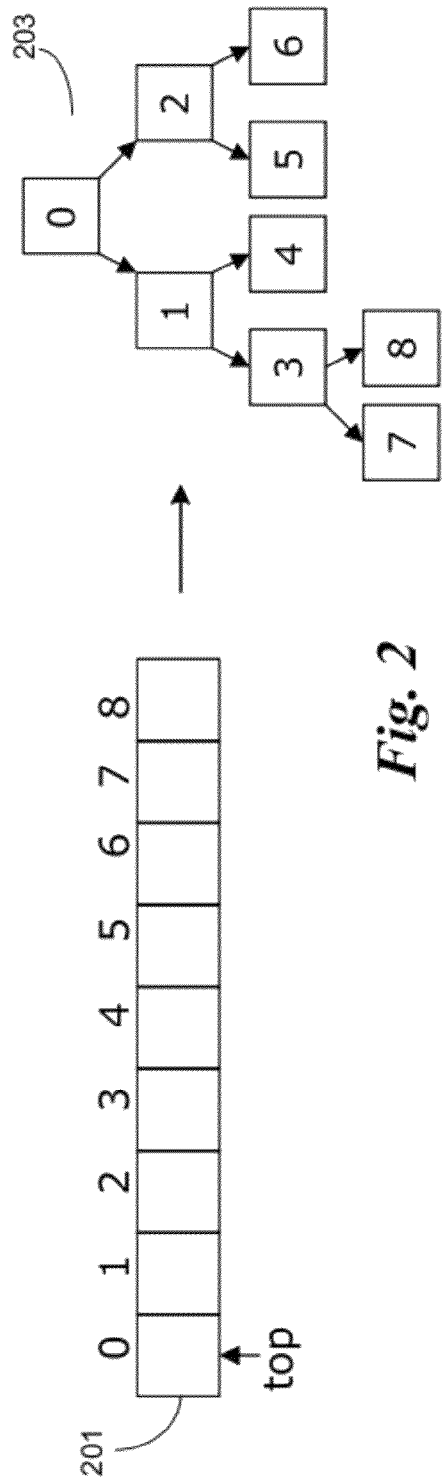
FIG. 2 illustrates the array to hold a priority queue, and how the underlying heap representation of the priority queue maps onto the array, according to an embodiment of the invention.

In an embodiment, the priority queue is represented by an array-based heap, as shown in FIG. 2. In this embodiment, the queue is stored as an array 201 where the numbers indicate the position in the array. The priority queue is represented as a heap 203 where the numbers in the blocks correspond to the item's location in the array 201. It will be understood that there are various ways of implementing queues and heaps using data structures available in the computing sciences. The description herein is meant to be illustrative and not limiting to deployment and implementation. In an embodiment, the priority queue being stored in an array necessitates a need to maintain a balanced heap. Thus, pushing items onto the bottom of the heap helps maintain the balance, before re-sorting the heap, also known as heap-sorting. While the heap could be stored in a linked list in some implementations, storing the heap in an array produces less overhead.

Figure 3:
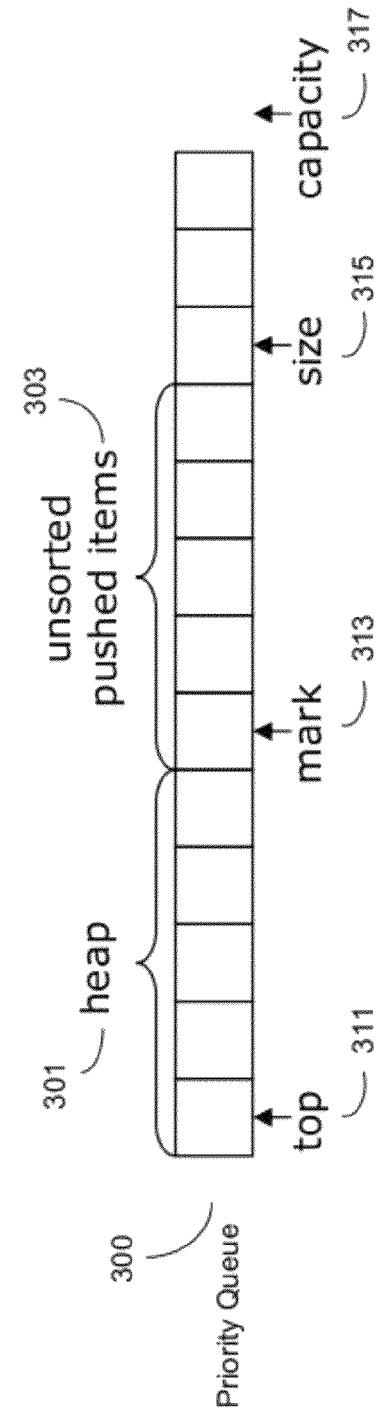
FIG. 3 illustrates a representation of a priority queue with heap-sorted items and unsorted items, according to an embodiment of the invention.

Now referring to FIG. 3, there is shown a representation of the priority queue 300, according to an embodiment of the invention. In this queue, there are items which have been sorted into the prioritized heap 301, and also unsorted items 303 which have been pushed onto the queue, but not yet sorted. Various items of the queue are identified such as the top 311, a mark 313 for the beginning of the unsorted items, the size 315 of the queue, and the capacity 317 of the queue. In existing systems, items are typically sorted immediately when placed on the priority queue, which requires on the order of O(log n) operations for each item added to the heap, where log n is the height of the heap, and n is the number of items in the heap. However, embodiments of the invention optimize sort operations on the queue by postponing the sorting for some items 303.

The active handler examines each cpq_operation of waiting threads in the op_list in turn. When the operation is a push, or enqueue, the item to be pushed is copied from the operation node to the end of the heap in the unsorted area 303 in O(1) time. This time may be somewhat increased in the infrequent event that the queue needs to be resized, e.g., when capacity 317 will be exceeded by adding an element to the queue. The handler then sets the ready flag for the cpq_operation which enables the thread that was waiting on that push operation to continue with other work.

Figure 9:
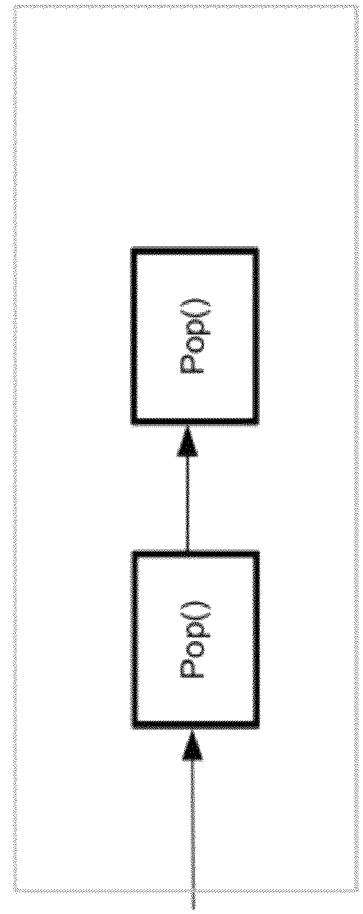
FIG. 9 is an illustration of an example dequeue list, or pop_list, according to an embodiment of the invention.

When the operation is a pop, two checks are made by the handler. First, if the heap 301 is empty and there are no recently pushed items in the unsorted section 303, then the ready flag is set to allow the thread to continue. In some implementations, the ready flag returns a value indicating the success or failure of the pop operation to obtain an item from the priority queue. Second, if the unsorted area 303 is not empty and if the last added item (in the unsorted area 303) has a higher priority than the top of the heap 311 (assuming the heap 301 is not empty), then that item is returned, and the ready flag is set for the waiting thread. If the heap 301 is empty, the last added item is returned. This immediate pop of an item in the unsorted list 303 obviates the need for that item to ever be sorted into the heap 301, thereby saving operational costs of sorting the heap. It should be noted that there may be other operation nodes in the unsorted list that have a higher priority than the last one pushed, even though that operation node had a higher priority than the top node 311. However, all items in the unsorted list are assumed to be concurrent, as they all arrived "simultaneously" from different threads, and are to be handled by a single thread. Thus, it is important only that the priority be greater than the top node, and not the other unsorted nodes. If neither of the above cases holds, then the cpq_operation is set aside on another list, pop_list, as shown in FIG. 9, for later dequeuing from the priority queue. The pop_list 900 is merely a list, typically a linked list, for holding those pop operations that were not able to be immediately handled in constant time. Since there are at most P aggregated operations, where P is the number of threads, this first pass through the op_list will take O(P) time. The active handler next re-examines each cpq_operation in the pop_list in turn. The same checks as described above are made.

If the heap and unsorted items section are both empty, the ready flag is set, so that the thread waiting on the pop/dequeue operation may resume normal execution. If the last added element (in the unsorted section) has higher priority than the top of the non-empty heap, or the heap is empty, that element is returned and the ready flag set on the waiting thread. If neither case holds, the top of the heap, as highest priority, is returned, the ready flag is set, and one of the following is placed at the top of the heap, and pushed down into the heap until it is in the proper place: (a) the last added (unsorted) item; or (b) the last item in the heap, if there are no recently added unsorted items.

Pushing a new item into the heap takes O(log N) time. If an element can be popped and replaced with a recently added item, then the push operation is virtually free because to add the unsorted item to the heap requires O(log N), but had it been inserted into the heap initially, and then re-sorted after the pop, then it would require 2*O(log N).

When all operations are completed from op_list and pop_list, either enqueued or dequeued to/from the priority queue, and all waiting threads have been released except for the handler, the handler will check for any remaining unsorted pushed items 303 in the priority queue. If there exist unsorted items, then the handler launches a heapify operation to merge those items into the heap, and sort the queue appropriately. By the time the handler thread has finished with operating on the op_list, pop_list and priority queue, all unsorted (concurrent) items will have either been sorted into the priority queue heap, or popped from the queue.

The handler_busy flag is then reset to allow the waiting handler to begin operations on the pending_operations list (to become the new op_list). Up to P operations are handled by one handler thread at the same time. Only the active handler thread accesses the heap data structure and associated variables of the priority queue. Thus, better cache behavior will result since multiple threads are not accessing memory at the same time.

Figure 10:
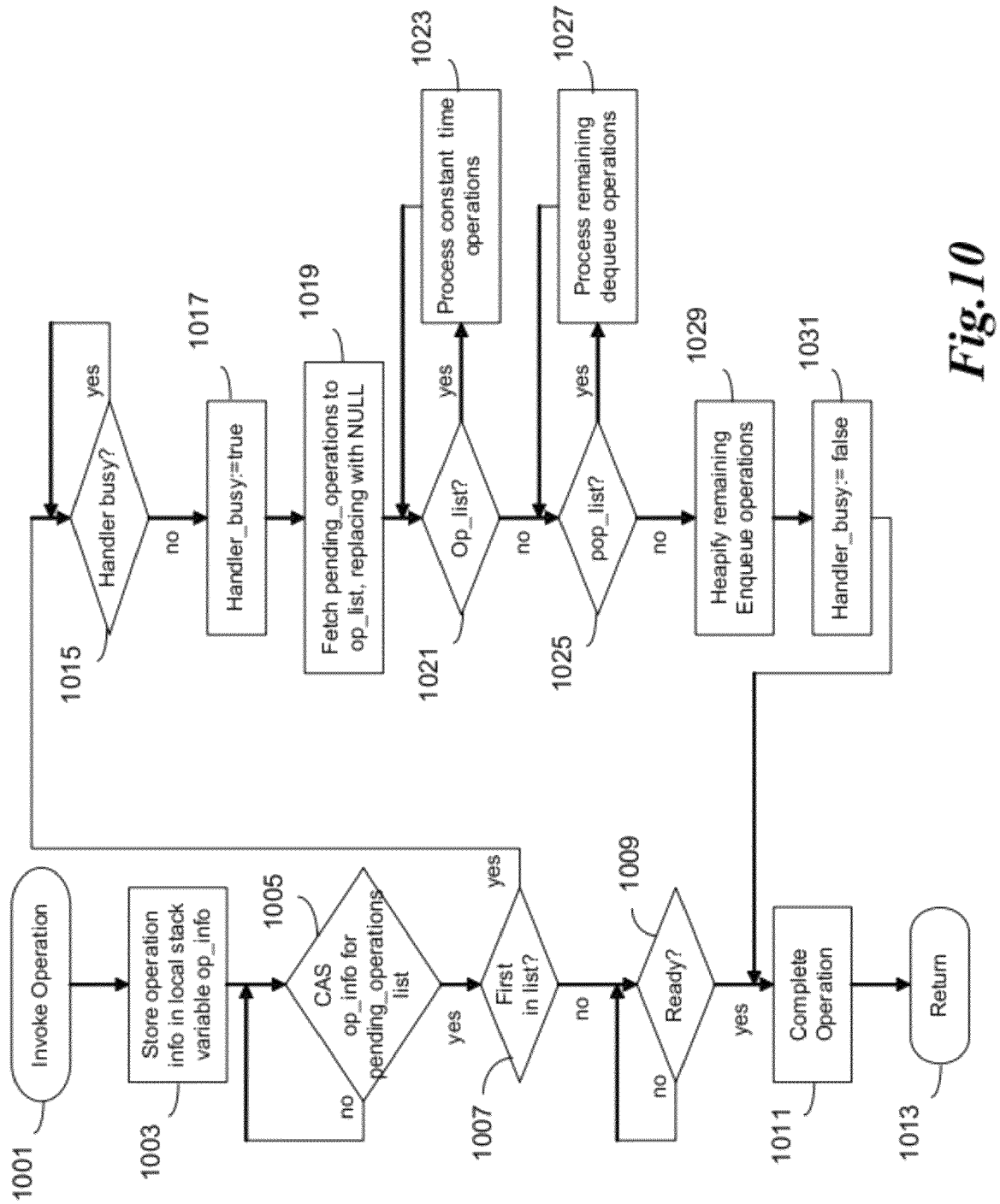
FIG. 10 is a flow chart illustrating a method for integrating synchronization and aggregation and enqueue/dequeue optimization for pushing and popping items to/from a concurrent priority queue, according to an embodiment of the invention.

Referring to FIG. 10, a flow chart illustrating both the synchronization and aggregation, as well as the enqueue/dequeue optimization is shown, according to an embodiment of the invention. In an embodiment, the synchronization and aggregation component, threads record an enqueue (push) or dequeue (pop) operation onto a list, rather than perform the operation on the actual concurrent priority queue, starting in block 1001. The threads store information about that operation in a local stack variable op_info (1003), and then prepend a pointer to that information to the pending_operations list via the atomic compare_and_swap operation (1005) on the head of the list, as discussed above. In the process of adding this information, the thread will either be the first thread to add information to the list, or the list will already have information about operations from other threads. If the thread is not the first, as determined in block 1007, it simply spin-waits on a ready flag (1009), a field of the local stack variable op_info, until the operation is complete. However, if the thread is the first to add to the pending_operations list, it becomes the handler of the operations for that list, and waits for the handler_busy flag to be reset (1015) before acting on the operations in the pending_operations list. Other threads may continue to add operations to the pending_operations list until the waiting handler thread is able to begin operating on the list, when the handler_busy flag becomes FALSE. When a non-handler thread's ready flag is set, as determined in 1009, it knows that its operation has been executed on the priority queue and can complete any additional work required by the operation at block 1011 before returning from the operation at 1013.

The handler's responsibility is to process the operations in the pending_operations list (now pointed to by op_list) and enqueue or dequeue the items to/from the concurrent priority queue. To do this, the handler first ensures that it is the only active handler by spin-waiting on a non-atomic handler_busy flag (1015). This flag need not be atomic, because at most one thread will be actively handling operations, and at most one thread will be trying to become the handler at a time. When the handler_busy flag becomes unset, or changed to FALSE, the next waiting handler sets the flag (TRUE) in block 1017, and becomes the active handler. The active handler may then atomically obtain the pending_operations list via a fetch_and_store operation, in block 1019, leaving behind an empty list to which threads with subsequent operations may append (an empty pending_operations list). It should be noted that the thread that adds the first item to that empty list will be the next thread to wait for the handler_busy flag to become unset and will become the next active handler.

Meanwhile, the active handler proceeds to handle the operations in the pending_operations list, which is now pointed to by op_list. The loop beginning at block 1021 effectively handles each operation in the op_list until there are no more items in the list. Each item associated with an enqueue operation is placed at the end of the priority queue into an unsorted list, in block 1023, which takes a constant time O(1). If the operation is a dequeue (pop) operation, then the operation is added to the pop_list for later processing, unless it can be performed in constant time.

The underlying representation of the priority queue is a heap stored in an array, as discussed above. On their own, the individual enqueue and dequeue operations would each take O(log n) time to execute, where n is the number of elements already in the heap. In an embodiment, the aggregated operations are re-ordered so that enqueue operations are performed first, and dequeue operations second. The list is processed one operation at a time. Each enqueue operation to the priority queue is handled in constant time by placing the new element at the very end of the queue, and setting the ready flag on the waiting thread so that it can resume execution on other work. Each dequeue operation is examined to see if it can be handled in constant time: if the priority queue is empty, the operation may return an unsuccessful status; or, if there are newly added elements that have not been inserted into the heap yet, the last entered element may be examined to see if it has higher priority than the current top of the heap (e.g., add the item to the top, not the bottom), and if so, that element is returned. For these cases, the ready flag is set so that the waiting thread can continue. In most cases, neither of these situations occur, and the dequeue operation is set aside in a separate pop_list for later processing.

Once all operations in op_list have been examined and either handled in constant time or moved to pop_list, the handler parses through the remaining dequeue operations in the pop_list, in blocks 1025 and 1027. For each dequeue operation, the current top of the heap is compared with the last element in the priority queue's heap array (unsorted items). If the last element has higher priority (because it may be a newly enqueued element that has not been pushed into the sorted heap yet), it is simply returned as the result of the dequeue operation, and the ready flag is set. If the top of the heap has higher priority, the top element is extracted and returned, and the ready flag is set. The last element in the unsorted portion of the list is then placed at the top of the heap in place of the item just removed, and then pushed down the heap until it is in the proper position using a typical O(log n) heap insert operation.

Before the handler can safely give control over to the next handler, it needs to process any remaining enqueued elements that have not yet been pushed into the heap during the processing of the pop_list. These elements are pushed up the heap from their current positions at the bottom, in block 1029. This process is also known as "heapifying" which is performed in O(k+log n) time, where k is the number of remaining enqueued, but unsorted, elements.

When the handler is finished enqueuing or dequeuing all of the operations from the original op_list, and has heapified any remaining unsorted items, it gives control over to the waiting handler by unsetting the handler_busy flag, in block 1031, and the cycle repeats.

In an embodiment, the enqueue/dequeue optimization component defines how a handler processes the op_list. Processing of the op_list elapses O(P) time, where P is the number of threads. Heap-sorting of the priority queue is not performed until dequeue operations (non-constant time) have been processed from the pop_list. Because threads wait for their operations before continuing processing, there can never be more than one operation per thread in any pending_operations list, or op_list. Further, because each thread is represented in the list by at most one operation, and the list represents (nearly) simultaneous operations, the operations may be handled in any order while still preserving the linearizability of the algorithm.

The synchronization mechanism of the first component provides a linearization point for all the operations in a particular pending operation list—the time at which the handler thread completes the fetch_and_store operation that captures the pending_operations list. It should be noted that any two operations in different pending_operations lists will have a different linearization point; thus, the operation with the later linearization point will operate using the effects of the earlier operations in the priority queue. In other words, two operations i and j with linearization points $t_i$ and $t_j$ thus have the following property: if $t_i < t_j$, then operation j sees the effect of operation i on the priority queue. All operations in the same list happen in a serial order determined by an algorithm described herein, while preserving serializability, but since they have the same linearization point, they effectively happen simultaneously.

FIGS. 4-8 show an example of the enqueue and dequeue operations performed by the handler on the priority queue, according to an embodiment of the invention. Referring now to FIG. 4, there is shown an op_list 110*a* in its start state, before the handler commences with enqueues and dequeues to/from the priority queue 400. The op_list was taken from the fetched pending_operations 110). At this point, the heapified portion of the priority queue has five items (36, 22, 32, 14 and 5), and the unsorted portion 403 is empty. The op_list 110*a* illustrates that thread T1 101 is to push item 42 onto the queue, T3 103 is to push item 27 onto the queue, and T2 102 is to pop an item (with the highest priority).

FIG. 5 illustrates the enqueue operation of T1 101. The handler performs the push (42) operation of T1 and adds item 42 to the unsorted portion 403*a* of the priority queue 400*a*.

FIG. 6 illustrates the handler performing the pop operation of T2, after the item of T3 has also been pushed into the unsorted portion 403*b* (because, as discussed above, all push operations and constant-time pop operations are handled before non-constant time pop operations). In this example, the pop operation of T2 cannot be performed in constant time, so it was added to the pop_list 601 for later dequeuing. As discussed above, the handler checks to ensure that the heap 401 is not empty before performing the pop/dequeue. In this example, the last item, 27, in the unsorted portion of the priority queue is of a lower priority than the item at the top of the queue (36). Therefore, the handler proceeds to dequeue the top item of the heap, as shown in FIG. 7. Item 36 is removed from the heap 401 and the handler sets the ready flag so that T2 may proceed. The last pushed item 27 is then placed where 36 was removed, and then sorted into the appropriate location based on relative priority as shown in 401*a*. The unsorted list 403*c* now holds only item 42.

Figure 8:
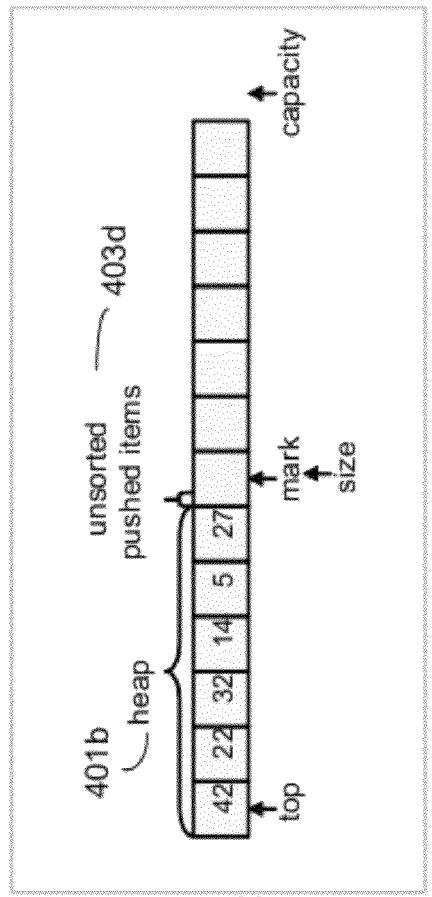

After all items from the original op_list are enqueued and dequeued to/from the priority queue by the handler, the remaining unsorted items in the priority queue are heapified, as illustrated in FIG. 8. Item 42 in the unsorted list is inserted into the heap, and the entire heap 401*b* is heap-sorted by priority.

Figure 11:
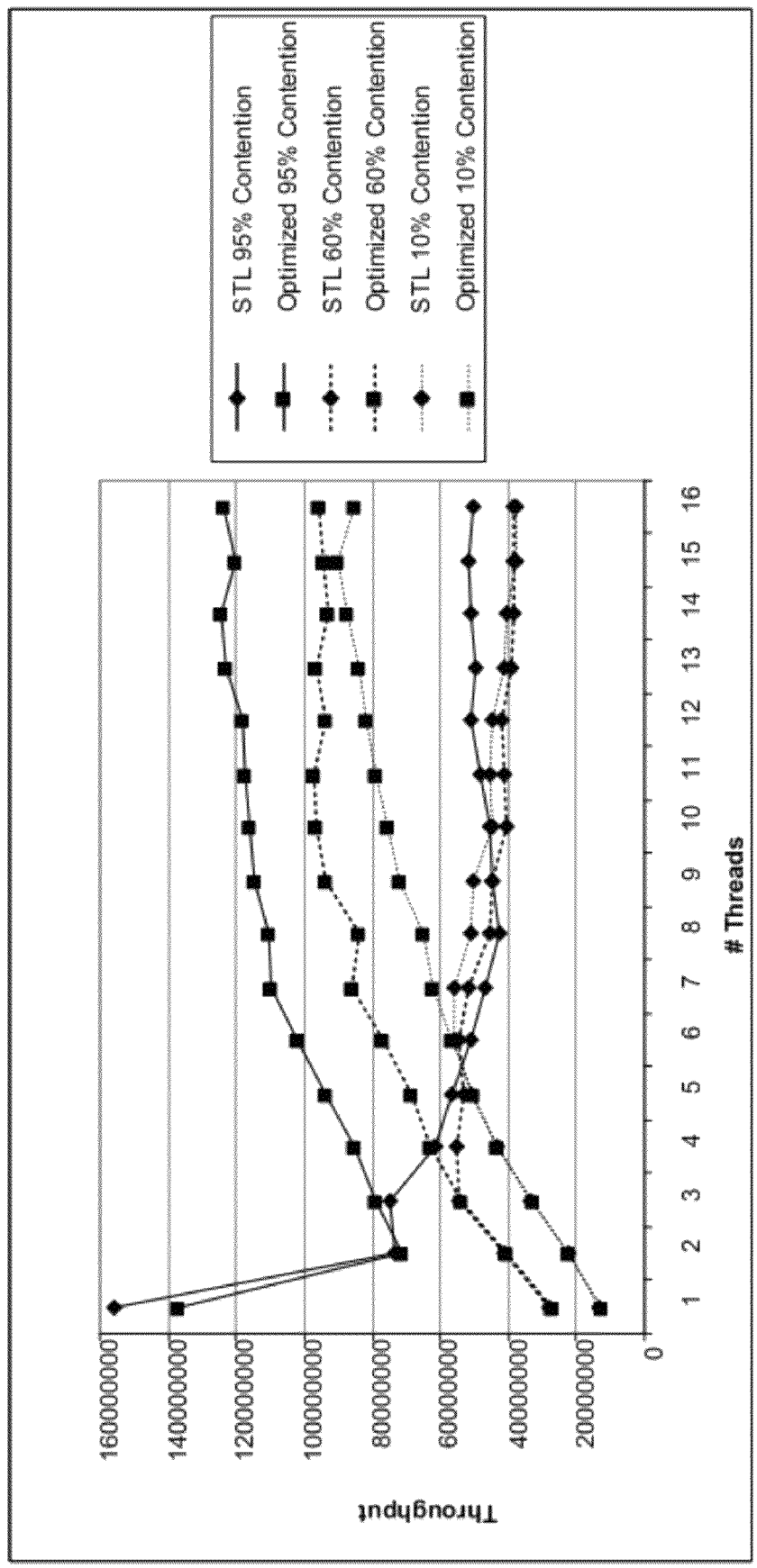
FIG. 11 shows various throughput measures for embodiments of the invention, as compared to benchmark metrics.

FIG. 11 shows throughput for embodiments of the invention, shown as "optimized" versus a spin-lock-wrapped STL (C++ Standard Template Library) priority queue for a simple benchmark under high, moderate and low contention, for both single-thread-per-core and hyperthreading on an 8-core Nehalem, available from Intel Corp. 100% contention corresponds to zero busy-wait time, each percent less adds approximately 0.025 μs to the busy-wait time, so for example, 60% corresponds to 1 μs.

Figure 12:
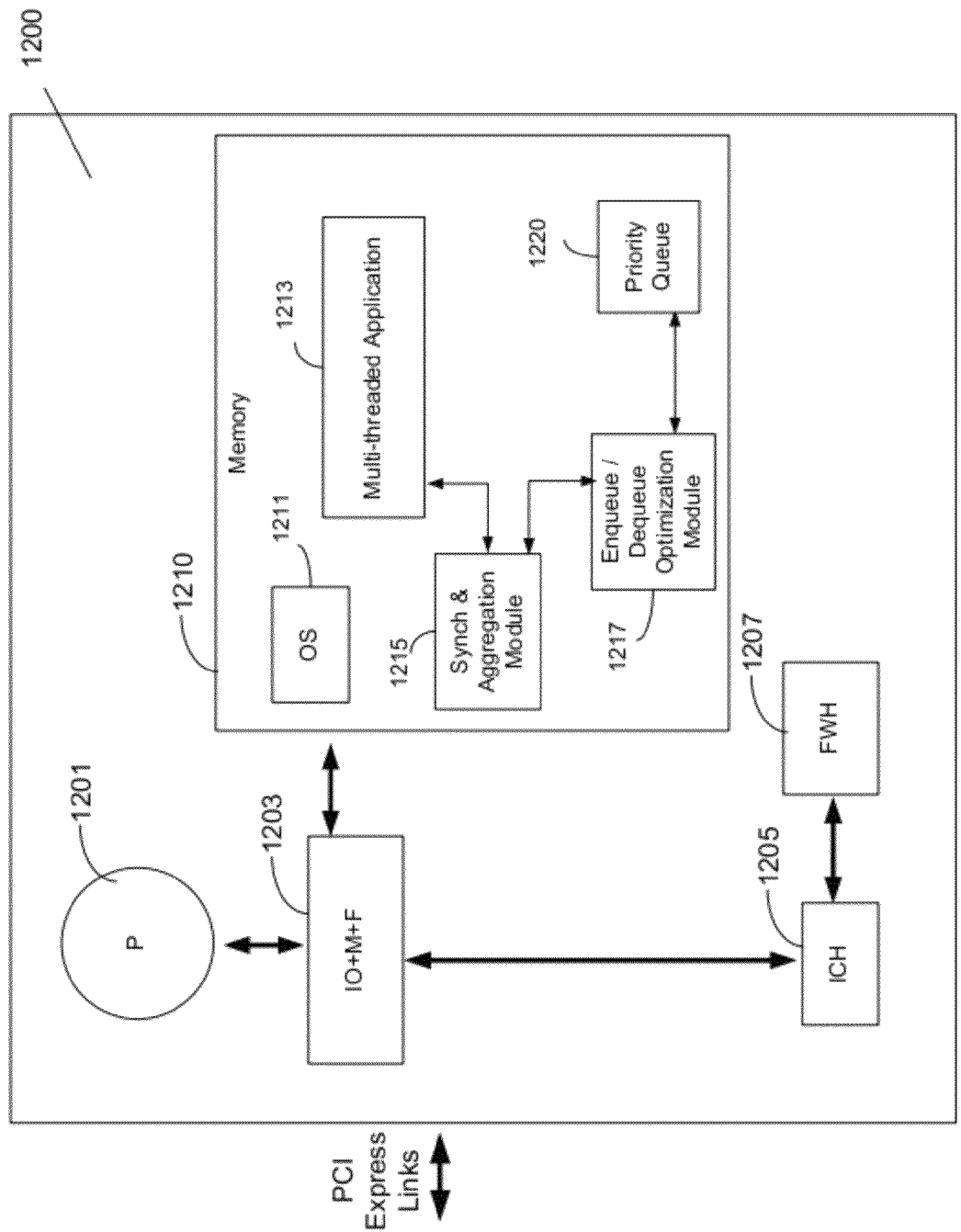
FIG. 12 is a block diagram of an example computing system on which embodiments of the invention may be implemented.

FIG. 12 is a block diagram of an example computing system 1200 on which embodiments of the invention may be implemented. It will be understood that a variety of computer architectures may be utilized without departing from the spirit and scope of embodiments described herein. System 1200 depicts a point to point system with one or more processors. The claimed subject matter may comprise several embodiments, for instance, one with one processor 1201, or a system with multiple processors and or multiple cores (not shown). In an embodiment, each processor may be directly coupled to a memory 1210, and connected to each processor via a network fabric which may comprise either or all of: a link layer, a protocol layer, a routing layer, a transport layer, and a physical layer. The fabric facilitates transporting messages from one protocol (home or caching agent) to another protocol for a point to point network.

In another embodiment, the memory 1210 may be connected to the processor 1201 via a memory control device. The processor 1201 may be coupled to a graphics and memory control 1203, depicted as IO+M+F, via a network fabric link that corresponds to a layered protocol scheme. The graphics and memory control is coupled to memory 1210 and may be capable of receiving and transmitting via peripheral component interconnect (PCI) Express Links Likewise, the graphics and memory control 1203 is coupled to the input/output controller hub (ICH) 1205. Furthermore, the ICH 1205 is coupled to a firmware hub (FWH) 1207 via a low pin count (LPC) bus. Also, for a different processor embodiment, the processor may have external network fabric links. The processor may have multiple cores with split or shared caches with each core coupled to an X-bar router and a non-routing global links interface. An X-bar router is a point to point (pTp) interconnect between cores in a socket. X-bar is a "cross-bar" meaning that every element has a cross-link or connection to every other. This is typically faster than a pTp interconnect link and implemented on-die, promoting parallel communication. Thus, the external network fabric links are coupled to the X-bar router and a non-routing global links interface.

An embodiment of a multi-processor system (not shown) may comprise a plurality of processing nodes interconnected by a point-to-point network. For purposes of this discussion, the terms "processing node" and "compute node" are used interchangeably. Links between processors are typically full, or maximum, width, and links from processors to an IO hub (IOH) chipset (CS) are typically half width. Each processing node may include one or more central processors coupled to an associated memory which constitutes main memory of the system. In alternative embodiments, memory may be physically combined to form a main memory that is accessible by all of processing nodes. Each processing node may also include a memory controller to interface with memory. Each processing node including its associated memory controller may be implemented on the same chip. In alternative embodiments, each memory controller may be implemented on a chip separate from its associated processing node.

Each memory 1210 may comprise one or more types of memory devices such as, for example, dual in-line memory modules (DIMMs), dynamic random access memory (DRAM) devices, synchronous dynamic random access memory (SDRAM) devices, double data rate (DDR) SDRAM devices, or other volatile or non-volatile memory devices suitable for server or general applications.

The system may also include one or more input/output (I/O) controllers 1205 to provide an interface for processing the nodes and other components of system to access to I/O devices, for instance a flash memory or firmware hub (FWH) 1207. In an embodiment, each I/O controller 1205 may be coupled to one or more processing nodes. The links between I/O controllers 1205 and their respective processing nodes 1201 are referred to as I/O links. I/O devices may include Industry Standard Architecture (ISA) devices, Peripheral Component Interconnect (PCI) devices, PCI Express devices, Universal Serial Bus (USB) devices, Small Computer System Interface (SCSI) devices, or other standard or proprietary I/O devices suitable for server or general applications. I/O devices may be wire-lined or wireless. In one embodiment, I/O devices may include a wireless transmitter and a wireless transmitter receiver.

The system may be a server, a multi-processor desktop computing device, an embedded system, a network device, or a distributed computing device where the processing nodes are remotely connected via a wide-area network.

In an embodiment an operating system (OS) 1211 resides in memory 1210 for executing on the processor 1201. It will be understood that the system architecture may include virtual machines or embedded execution partitions running separate operating systems and/or separate cores or processors in a multi-core or multi-processor system. In either case, the OS 1211 operates in conjunction with multi-threaded applications 1213. In an embodiment, a multi-threaded application 1213 requires the use of a priority queue 1220, for efficient operation. The multi-threaded application has a synchronization and aggregation module 1215, as described above, for scheduling thread-based operation nodes (items to be pushed or popped from the priority queue 1220) onto a pending operations list. Once a thread is designated as active handler for the pending operations list, as described above, the active handler utilizes an enqueue/dequeue optimization module 1217 to optimize enqueue and dequeue operations of the priority queue 1220, according to the items in the pending operation list.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers) an embedded processor such as those coupled to an automobile, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A computer implemented system, comprising:
a processor coupled to memory, the processor configured to execute multi-threaded application programs;
a multi-threaded application executing on the processor, the multi-threaded application program configured to utilize a concurrent entity, and wherein a plurality of threads of the multi-threaded application are configured to generate a plurality of operation nodes to operate upon the concurrent entity concurrently with other threads;
a synchronization and aggregation logic component coupled to the multi-threaded application and configured to accept operation nodes from the plurality of threads, each operation node corresponding to a single thread, the accepted operation nodes to be placed in a temporary list, the operation nodes defining an operation to perform on the concurrent entity, wherein only one thread, known as a handler thread, is permitted to operate on the temporary list to perform the operations on the concurrent entity, and wherein each thread is permitted to provide only one operation node to the temporary list and waits until the corresponding operation node has been processed by the handler thread before being permitted to provide another operation node to a second temporary list; and
the concurrent entity stored in the memory accessible to the multi-threaded application program, wherein the concurrent entity comprises a concurrent priority queue configured to accept enqueue and dequeue operations, and wherein each operation node comprises one of either an enqueue or dequeue operation.

2. The system as recited in claim 1, wherein the handler thread is configured to poll a handler_busy flag to determine whether operation on the temporary list is to commence, and wherein the handler thread for the temporary list is a thread having added an operation node to the temporary list before any other thread.

3. The system as recited in claim 1, wherein a thread is configured to poll a ready flag after placing an operation node on the temporary list, the ready flag being an indicator of whether the thread is permitted to continue operation, and wherein the handler thread is configured to reset the ready flag corresponding to the thread after processing the operation node from the temporary list.

4. The system as recited in claim 1, wherein the handler thread is configured to retrieve the temporary list into a new pointer object, and to replace the original temporary list with an empty list, both via an atomic operation.

5. The system as recited in claim 1, wherein the threads are configured to place an operation node in the temporary list via an atomic operation.

6. The system as recited in claim 1, further comprising:
an enqueue/dequeue optimization logic component coupled to the multi-threaded application and having access to the concurrent priority queue, wherein the handler thread is configured to operate on the temporary list to process both enqueue operation nodes as they apply to the concurrent priority queue as well as constant-time dequeue operations, prior to operating on non-constant-time dequeue operations, before re-sorting items in the concurrent priority queue, and wherein enqueue operations are performed before all non-constant time dequeue operations, and wherein the handler thread is further configured to provide a fully heap-sorted concurrent priority queue to the multi-threaded application after performing all operation nodes and re-sorting the concurrent priority queue.

7. The system as recited in claim 6, wherein the concurrent priority queue comprises an array data structure stored in the memory, where, when non-empty, at least a portion of the array elements are sorted into a heap.

8. The system as recited in claim 7, wherein the hander thread is configured to process enqueue and dequeue operation nodes from the temporary list one at a time, wherein enqueue operation nodes are added to an unsorted portion of the concurrent priority queue until a dequeue operation node is processed, and wherein when a last item added to the unsorted portion of the priority queue has a higher priority than a highest priority item in the heap, the thread is configured to perform a dequeue operation by returning the last enqueued item added to the unsorted portion, and when all enqueue operation items have been added to the unsorted portion of the concurrent priority queue, then performing any remaining dequeue operation nodes and re-sort the heap portion of the concurrent priority queue as operation nodes are removed from the heap.

9. A computer implemented system, comprising:
a processor coupled to memory, the processor configured to execute multi-threaded application programs;
a multi-threaded application executing on the processor, the multi-threaded application program configured to utilize a concurrent priority queue stored in the memory and configured to accept enqueue and dequeue operations, and wherein a plurality of threads of the multi-threaded application are configured to generate a plurality of operation nodes to operate upon the concurrent priority queue concurrently with other threads, and wherein each operation node comprises one of either an enqueue or dequeue operation;
an enqueue/dequeue optimization logic component coupled to the multi-threaded application and having access to the concurrent priority queue, wherein a handler thread is configured to operate on the temporary list to process both enqueue operation nodes as they apply to the concurrent priority queue as well as constant-time dequeue operations, prior to operating on non-constant-time dequeue operations, before re-sorting items in the concurrent priority queue, and wherein enqueue operations are performed before all non-constant time dequeue operations, and wherein the handler thread is further configured to provide a fully sorted concurrent priority queue to the multi-threaded application after performing all operation nodes and re-sorting the concurrent priority queue.

10. The system as recited in claim 9, wherein the concurrent priority queue comprises an array data structure stored in the memory, where, when non-null, at least a portion of the array elements are sorted into a heap.

11. The system as recited in claim 10, wherein the handler thread is configured to process enqueue and dequeue operation nodes from the temporary list one at a time, wherein enqueue operation nodes are added to an unsorted portion of the concurrent priority queue until a dequeue operation node is processed, and wherein when a last item added to the unsorted portion of the priority queue has a higher priority than a highest priority item in the heap, the thread is configured to perform a dequeue operation by returning the last enqueued item added to the unsorted portion, and when all enqueue operation items have been added to the unsorted portion of the concurrent priority queue, then performing any remaining dequeue operation nodes and re-sort the heap portion of the concurrent priority queue as operation nodes are removed from the heap.

12. The system as recited in claim 9, wherein the handler thread is further configured to reset a handler_busy flag after completing processing of the temporary list, the handler_flag to indicate that a waiting thread may commence processing on a second temporary list comprising operation nodes.

13. The system as recited in claim 9, further comprising:
a synchronization and aggregation logic component coupled to the multi-threaded application and configured to accept operation nodes from the plurality of threads, each operation node corresponding to a single thread, the accepted operation nodes to be placed in a temporary list, the operation nodes defining an operation to perform on the concurrent priority queue, wherein only one thread, known as a handler thread, is permitted to operate on the temporary list to perform the operations on the concurrent priority queue, and wherein each thread is permitted to provide only one operation node to the temporary list and waits until the corresponding operation node has been processed by the handler thread before being permitted to provide another operation node to a second temporary list; and
the temporary list stored in the memory accessible to the enqueue/dequeue optimization logic component for processing with the concurrent priority queue.

14. The system as recited in claim 13, wherein the handler thread is configured to poll a handler_busy flag to determine whether operation on the temporary list is to commence, and wherein the handler thread for the temporary list is a thread having added an operation node to the temporary list before any other thread.

15. The system as recited in claim 13, wherein a thread is configured to poll a ready flag after placing an operation node on the temporary list, the ready flag being an indicator of whether the thread is permitted to continue operation, and wherein the handler thread is configured to reset the ready flag corresponding to the thread after processing the operation node from the temporary list.

16. The system as recited in claim 13, wherein the handler thread is configured to retrieve the temporary list into a new pointer, and to leave behind an initially empty list comprising the second temporary list, both via an atomic operation.

17. The system as recited in claim 13, wherein the threads are configured to place an operation node in the temporary list via an atomic operation.

18. A non-transitory machine accessible medium having instructions stored thereon, the instructions when executed on a machine, cause the machine to:
add operation nodes to a temporary list, by at least one thread of a plurality of threads executing in a multi-threaded application running on the machine;
assign a first thread that added an operation node to the temporary list a role as handler thread for the temporary list;
wait by the handler thread for a flag indicating processing of the temporary list is permitted to commence;
retrieve the temporary list and generate an initially empty second temporary list, by the handler thread, in an atomic operation, when the flag indicates processing of the temporary list is permitted to commence, wherein the second temporary list is to receive operation nodes by at least one thread when the at least one thread does not have an unprocessed operation node on the retrieved temporary list; and
process the temporary list by the handler thread into a concurrent entity, wherein the concurrent entity comprises a concurrent priority queue, and an operation node comprises either one of a dequeue or enqueue operation to be performed on the concurrent priority queue.

19. The medium as recited in claim 18, further comprising instructions to:
assign a second handler thread associated with the second temporary list upon the second handler thread having added a first operation node to the second temporary list; and
wait by the second handler thread until the temporary list has been processed by the handler thread before processing the second temporary list by the second handler thread.

20. The medium as recited in claim 18, wherein operation nodes are added to the temporary list by threads, via an atomic operation.

21. The medium as recited in claim 18, wherein the concurrent priority queue comprises an array data structure stored in the memory, where, when non-empty, at least a portion of the array elements are sorted into a heap.

22. The medium as recited in claim 21, further comprising instructions to:
process operation nodes in the temporary list by the handler thread, wherein enqueue operation nodes in the temporary list are added to the concurrent priority queue in constant time, and non-constant time dequeue operations in the temporary list are delayed until all constant-time enqueue and dequeue operation nodes in the temporary list have been processed by the handler thread; and
re-sort the concurrent priority queue after the temporary list has been processed by the handler thread, when necessary.

23. The medium as recited in claim 22, further comprising instructions to:
add enqueue operation items to an unsorted portion of the concurrent priority queue until a dequeue operation node is processed, and wherein when a last item added to the unsorted portion of the priority queue has a higher priority than a highest priority item in the heap, then perform a dequeue operation on the last enqueued item added to the unsorted portion; and
when all enqueue operation items have been added to the unsorted portion of the concurrent priority queue, then perform any remaining dequeue operation nodes and re-sort the heap portion of the concurrent priority queue as operation nodes are removed from the heap.

24. A non-transitory machine accessible medium having instructions stored thereon, the instructions when executed on a machine, cause the machine to:
process enqueue and dequeue operation nodes from a temporary list, the enqueue and dequeue operation nodes corresponding to operations to be performed on a concurrent priority queue associated with a multi-threaded application executing on the machine, the processing to be performed by a thread assigned to be a handler thread for the temporary list, and wherein the concurrent priority queue comprises an array data structure stored in memory, where, when non-empty, at least a portion of the array elements are sorted into a heap;
process operation nodes in the temporary list by the handler thread, wherein enqueue operation nodes in the temporary list are added to the concurrent priority queue in constant time, and non-constant time dequeue operations in the temporary list are delayed until all constant-time enqueue and dequeue operation nodes in the temporary list have been processed by the handler thread; and re-sort the concurrent priority queue after the temporary list has been processed by the handler thread, when necessary.

25. The medium as recited in claim 24, further comprising instructions to:

add enqueue operation nodes to an unsorted portion of the concurrent priority queue until a dequeue operation node is processed, and wherein when a last item added to the unsorted portion of the priority queue has a higher priority than a highest priority item in the heap, then perform a dequeue operation returning the last enqueued item added to the unsorted portion; and when all enqueue operation nodes have been added to the unsorted portion of the concurrent priority queue, then perform any remaining dequeue operation nodes and re-sort the heap portion of the concurrent priority queue as operation nodes are removed from the heap.

26. The medium as recited in claim 24, further comprising instructions to generate the temporary list, comprising:

assign a first thread that added an operation node to the temporary list a role as the handler thread for the temporary list;

wait by the handler thread for a flag indicating processing of the temporary list is permitted to commence; and retrieve the temporary list and generate an initially empty second temporary list, by the handler thread, via an atomic operation, when the flag indicates processing of the temporary list is permitted to commence, wherein the second temporary list is to receive operation nodes by at least one thread when the at least one thread does not have an unprocessed operation node on the retrieved temporary list.

27. The medium as recited in claim 26, further comprising instructions to:

assign a second handler thread associated with the second temporary list upon the second handler thread having added a first operation node to the second temporary list; and wait by the second handler thread until the temporary list has been processed by the handler thread before processing the second temporary list by the second handler thread.

28. The medium as recited in claim 26, wherein operation nodes are added to the temporary list by threads, via an atomic operation.

* * * * *